United States Patent [19]

Ramsbottom

[11] Patent Number: 5,120,621
[45] Date of Patent: Jun. 9, 1992

[54] HOLOGRAPHIC EXPOSURE METHOD AND APPARATUS

[75] Inventor: Andrew P. Ramsbottom, Bolton, England

[73] Assignee: Pilkington PE Limited, North Wales, United Kingdom

[21] Appl. No.: 483,059

[22] Filed: Feb. 21, 1990

[30] Foreign Application Priority Data

Feb. 24, 1989 [GB] United Kingdom ............... 8904320

[51] Int. Cl.⁵ .............................................. G03H 1/04
[52] U.S. Cl. ........................................ 430/1; 430/2; 359/1; 359/10; 359/15
[58] Field of Search ................ 430/1, 2; 350/3.6, 3.7, 350/3.67; 359/1, 10, 15

[56] References Cited

U.S. PATENT DOCUMENTS

| | | | |
|---|---|---|---|
| 3,503,050 | 3/1970 | Schools et al. | 430/1 |
| 3,650,605 | 3/1972 | Little | 350/3.7 |
| 4,155,630 | 5/1979 | Ih | 350/3.67 |
| 4,714,309 | 12/1987 | Woodcock et al. | 350/3.7 |
| 4,863,225 | 9/1989 | Howard | 350/3.7 |
| 4,938,550 | 7/1990 | Inagaki et al. | 350/3.7 |
| 4,984,856 | 1/1991 | Moss et al. | 359/10 |
| 5,015,049 | 5/1991 | Chang | 359/15 |

FOREIGN PATENT DOCUMENTS

| | | |
|---|---|---|
| 0194772 | 9/1986 | European Pat. Off. |
| 2054995 | 2/1981 | United Kingdom |
| 2071866 | 9/1981 | United Kingdom |
| 1602667 | 11/1981 | United Kingdom |
| 2159979 | 12/1985 | United Kingdom |

Primary Examiner—Charles L. Bowers, Jr.
Assistant Examiner—Thomas R. Neville
Attorney, Agent, or Firm—F. Eugene David, IV

[57] ABSTRACT

This invention relates to a method and apparatus for exposing a photosensitive film on a holographic plate to fabricate a reflective holographic optical element. The apparatus incorporates compensating means which are adapted to compensate for the effects of refractive index shift of the film due to refractive index variations during the exposure process. In one form of the apparatus, a hologram-mirror arrangement is placed on a table on an accurately controlled stepper motor rotating stage so that the table is progressively tilted. In an alternative arrangement the angle of the exposing radiation beam is changed and directed on to the stationary hologram-mirror arrangement. Where a tuneable holographic filter is required where the exposure angle varies over the hologram aperture angular shift is achieved by simple lateral and linear shift of the hologram. The compensating means can also comprise an arrangement for progressively changing the wavelength of the exposing radiation beam.

13 Claims, 3 Drawing Sheets

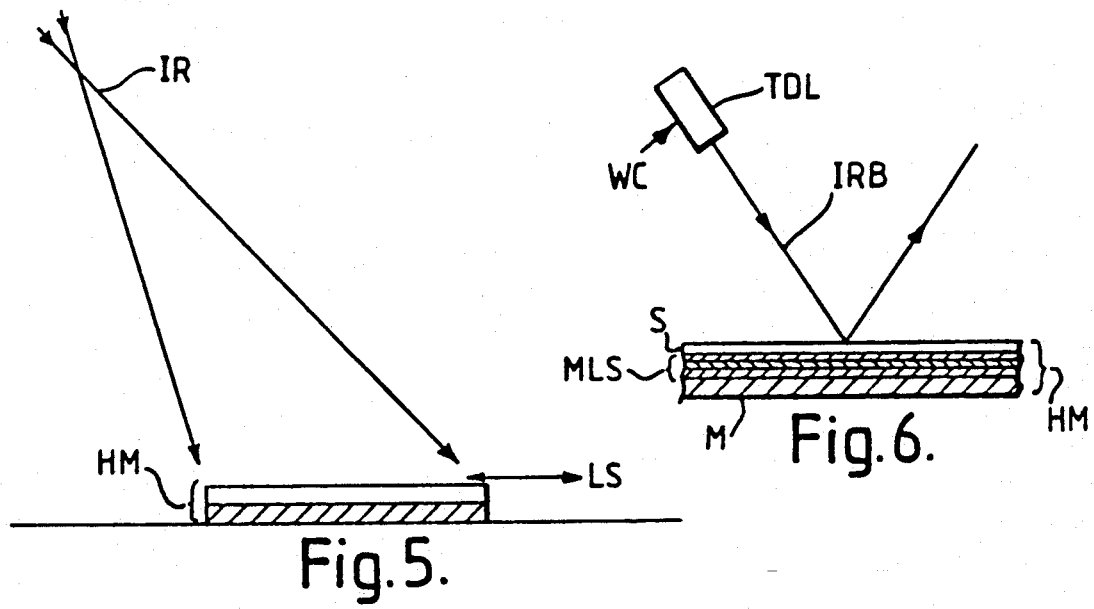
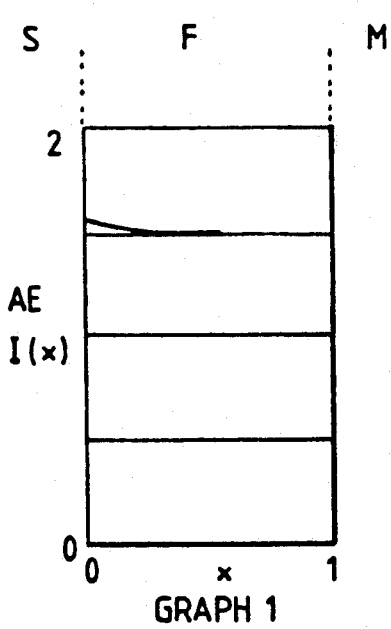
Fig.7.
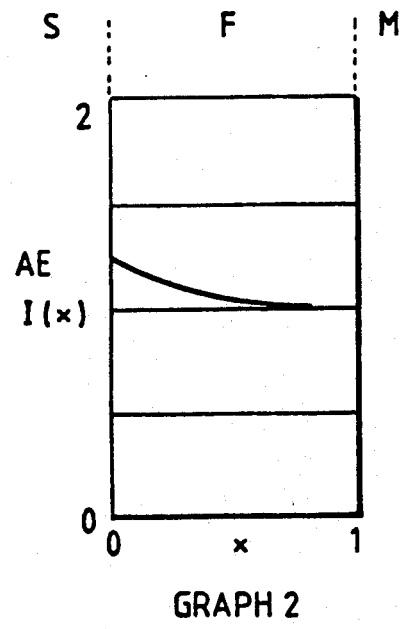
Fig.7a

HOLOGRAPHIC EXPOSURE METHOD AND APPARATUS

BACKGROUND OF THE INVENTION

The present invention relates to holographic optical elements and more particularly to a method and apparatus for the controlled exposure of a photosensitive film on a holographic plate.

A problem with reflective holographic optical elements is the limit placed on the effective or useable hologram thickness.

An aim of this invention is to provide a method and apparatus which alleviates this problem in an efficient and expeditious manner.

SUMMARY OF THE INVENTION

According to this invention there is provided a method of producing a reflective holographic optical element comprising the steps of exposing a photosensitive film on a holographic plate to incident radiation, reflecting radiation transmitted through the film back into the film to create interference fringes, and progressively changing the incident angle relative to the film and/or the wavelength of the incident radiation to compensate for refractive index changes in the film during exposure. Such compensation can avoid or reduce the time-varying fringe spacing which occurs through the photosensitive, or holographic film, during the exposure process due to absorption of actinic radiation causing a shift in the material bulk refractive index. This fringe shift has proved to be a distinct disadvantage in certain applications of reflective type holographic optical elements fabricated in materials whose refractive indices shift during hologram exposure, e.g. dichromated gelatin and photopolymers. Its avoidance or reduction can increase the obtainable effective thickness of the hologram.

The incident radiation is preferably constituted by an exposing radiation beam.

The compensating means may comprise an arrangement for progressively changing the angle of the exposing radiation beam during exposure. For example, a hologram-mirror arrangement used for recording may be progressively tilted while incident exposing radiation on the film remains stationary.

In a further arrangement, the angle of the incident exposing radiation beam may be changed by directing the exposing radiation beam on to the holographic plate by way of an angularly adjustable reflection means in the form of a mirror.

The compensating means may also comprise an arrangement for linearly shifting the holographic plate laterally relative to the exposing radiation beam. This is necessary when fabricating a hologram for use as a variable wavelength filter.

The compensating means may further comprise an arrangement for progressively changing the wavelength of the exposing radiation beam. Conveniently this can be achieved by the use of a tuneable dye laser and by accurately tuning the laser wavelength through the exposure process.

The compensating means may additionally comprise an arrangement whereby the instantaneous exposure of the holographic plate is levelled out throughout the whole of the film depth by simultaneous, additional exposure with uniform spatially incoherent radiation incident through a reflecting surface or mirror so as to improve the effectiveness of the aforementioned techniques.

In these circumstances the reflecting surface may consist of a suitably transmitting substrate coated with a multilayer dielectric stack designed to efficiently reflect the exposing laser radiation at the angle of exposure but allow efficient transmission of the incoherent compensating radiation over a practical angular range.

The invention is concerned also with apparatus which comprises compensating means adapted to compensate for the effects of refractive index shift of a photosensitive film on a holographic plate due to refractive index variation during exposure when fabricating a reflective holographic optical element.

From this aspect the invention more particularly provides apparatus for producing a reflective holographic optical element comprising a support for a holographic plate having a photosensitive film, exposure means for directing incident radiation at the plate on the support, a reflector to reflect light transmitted through the film back into the film to create interference fringes, and compensating means associated with the support and/or the exposure means to cause progressive relative angular movement between the support and the incident radiation and/or progressive change of wavelengths of the incident radiation to compensate for refractive index changes in the film during exposure.

The invention will be more readily understood from the following description of several exemplary embodiments which should be read in conjunction with the accompanying drawings of which:

BRIEF DESCRIPTION OF THE DRAWINGS

FIG. 5 illustrates a further form of apparatus which is utilised in a method to compensate for the effect of the refractive index shift according to this invention;

FIG. 6 illustrates yet a further form of apparatus which is utilised in a method to compensate for the effect of the refractive index shift, and also shows the reflector comprising a transmitting substrate coated with a multilayer dielectric stack according to this invention; and, FIG. 7 shows two graphs illustrating the effects on exposure levels of film absorption.

DESCRIPTION OF PREFERRED EMBODIMENTS

Figure 1:
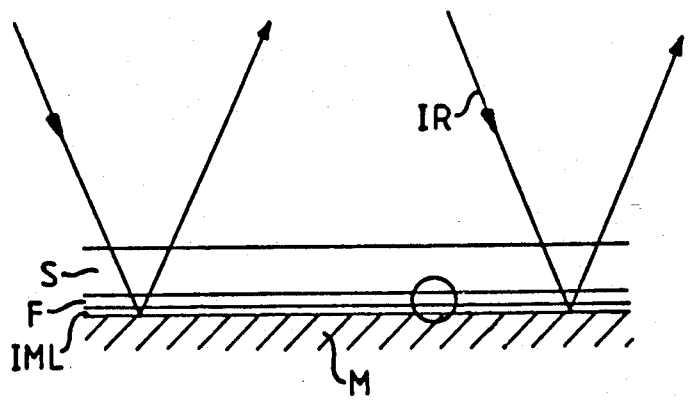
FIG. 1 illustrates a schematic diagram of a standard technique for the fabrication of reflective holographic optical elements.
Figure 1A:
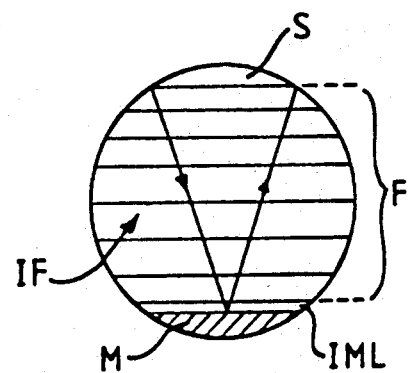

Referring now to the drawings, it is necessary to appreciate the standard technique for the fabrication of reflective holographic elements (H.O.E.'s). Such a technique is shown in FIG. 1, and consists of back reflection of incident radiation IR from a mirror M or other reflective surface disposed adjacent the hologram recording film F usually with an index matching liquid IML between, or indeed from the surface of the hologram recording film F itself. Interference fringes IF are formed between the incident and reflected radiation. These are recorded by the film and, after any necessary developing or processing has been carried out, are present as a modulation of the optical properties of the material; this then constitutes the hologram. The fringe spacing, or period of the modulation d, is related to the incident angle $\phi$, exposure wavelength, $\lambda$, and film refractive index, n, by the equation:

$$2 nd \cos \phi_f = \lambda \qquad \qquad 1.$$

where $\phi_f$ is the incident angle within the film after refraction according to Snell's law:

$$n \sin \phi_f = \sin \phi \qquad \qquad 2.$$

Combining equations 1 and 2, we obtain for the fringe spacing d:

$$d = \frac{\lambda}{2 \sqrt{n^2 - \sin^2 \phi}} \qquad \qquad 3.$$

In order to record an interference pattern of useful modulation the film must be held stationary with respect to the interference fringes, and these in turn must be of the same spacing during the whole of the exposure process. A change in any of the parameters $\phi$, $\lambda$ or n, in equation 3, results in a corresponding change in d.

A fundamental problem with certain holographic recording materials arises due to small changes in the refractive index of the film, as the film is exposed, due to absorption of actinic radiation. According to equation 3, this will give rise to corresponding changes in the fringe spacing, d, during the exposure process.

Figure 2:
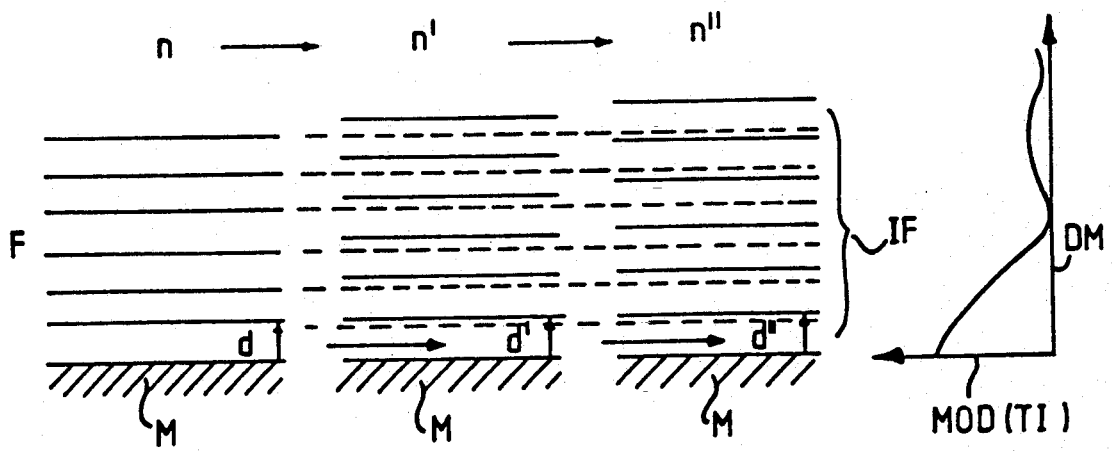
FIG. 2 illustrates a schematic diagram of the effect of refractive index shift during exposure of a reflective holographic optical element.

Referring now to FIG. 2, showing a schematic diagram of the effect of refractive index shift (n, n', n'') where the change in interference fringe IF spacing (d, d', d'') is indicated, it may be seen from the diagram that the recorded modulation is a time-integration MOD(TI) of this continuously changing fringe pattern, and progressively 'tails off' as the distance DM increases from the reflecting or mirror surface M as illustrated in FIG. 2. This effect places a limit on the hologram thickness and also results in a highly non-uniform or 'chirped' fringe modulation. The exact magnitude of the effect depends on the particular exposure geometry parameters.

By way of example, for a film in close contact with the mirror surface, a recording wavelength of 514.5 nm, an exposure angle $\phi$ of 10°, and an initial refractive index of 1.5, it can easily be shown that a change in the refractive index of 0.0001 will cause a change in fringe spacing equal to one half of the initial fringe period, after a depth within the film of approximately 125 $\mu$m. This represents a reasonable estimate of the effective hologram thickness. As for any thickness greater than this, the time-integrated holographic recording will result in substantial cancellation of any fringe modulation. This effect is clearly a major problem in those applications where high effective hologram thicknesses are required e.g. narrow bandwidth holographic filters and holograms for head-up displays which incorporate materials whose refractive indices shift significantly during exposure.

Accordingly consideration is now given to various holographic exposure techniques which are designed to provide a solution to the problem of refractive index shift.

Referring to equation 3, it is clear that it is possible to compensate for a change in refractive index, n, by a corresponding change in exposure angle, $\phi$. Thus, if the response of the film refractive index to exposure is known e.g. n(E), then this can be compensated by changing the incident angle of the exposing beam during exposure by an amount $\phi(E)$, where from equation 3:

$$\phi(E) = \arcsin\left\{ \sqrt{n(E)^2 - \frac{2}{4d^2}} \right\}$$

The angular variation during exposure may be achieved by a number of methods and these are now discussed.

Figure 3:
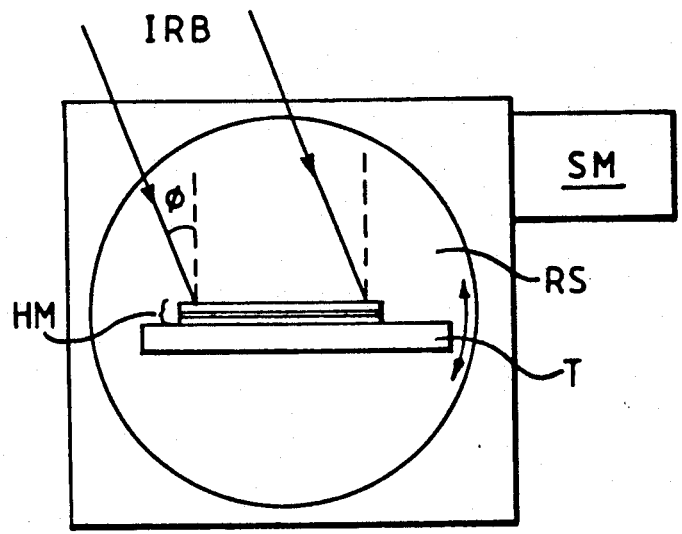
FIG. 3 illustrates one form of apparatus which is utilised in a method to compensate for the effect of the refractive index shift according to this invention.

The hologram-mirror arrangement HM may be tilted, while the incident radiation IRB is stationary. An example of this type of system is shown in FIG. 3 where the hologram and mirror are placed on a table T on an accurately controlled stepper-motor SM driven rotating stage RS so that the table T is progressively tilted.

Figure 4:
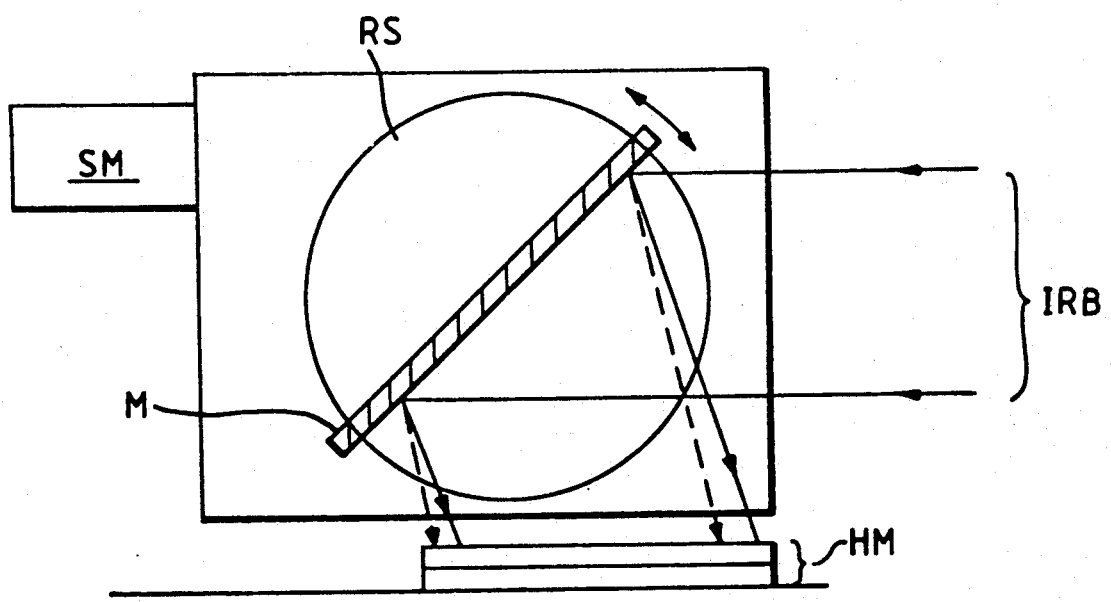
FIG. 4 illustrates another form of apparatus which is utilised in a method to compensate for the effect of the refractive index shift according to this invention.

Alternatively the angle of the exposing radiation beam IRB may be changed. An example of this type of system is illustrated in FIG. 4 whereby the exposing radiation beam IRB is directed on to the stationary hologram-mirror arrangement HM by way of a mirror M mounted on a stepper-motor SM driven rotating stage RS such that the mirror M is progressively rotated.

For a tuneable holographic filter i.e. where the exposure angle varies over the hologram aperture, angular shift can be achieved by a simple lateral and linear shift LS of the hologram-mirror arrangement HM as illustrated in FIG. 5. In this case the required variation $\phi(E)$ may not be achieved exactly over the full aperture. However a combination of angular tilting with vertical and horizontal linear shifting could be used to provide a sufficient approximation to the required $\phi(E)$ at all points over the aperture.

Other variants on these methods for changing the exposure angle, can be conceived for particular exposure arrangements.

Referring again to equation 3, it is evident that a further method of compensating for refractive index shift, would involve changing the wavelength, $\lambda$. The required variation, $\lambda$ (E) is given from equation 3 as:

$$\lambda(E) = 2d \sqrt{n(E)^2 - \sin^2 \phi}$$

This could be achieved, for example, as illustrated in FIG. 6 by using a tuneable dye laser TDL for hologram exposure, and accurately tuning the lasing wavelength during exposure by means of a wavelength control WC.

A further complication to the problem of refractive index shifting during exposure is that of non-uniform exposure throughout the film depth due to film absorption. Different depths within the film receive different levels of exposure and, therefore, shift refractive index by different amounts. Where film absorption is fairly low e.g. about 25%, this effect will probably be small (see FIG. 7 Graph 1), however, for high film absorption e.g. about 50%, the effect may become significant (see FIG. 7, Graph 2). This effect prevents complete correction of the refractive index shift throughout the whole film depth by simple angle or wavelength compensation.

To deal with this effect, a further refinement of these techniques is proposed, whereby the average exposure is levelled out throughout the whole of the film depth by an additional, simultaneous exposure with uniform spatially incoherent radiation, incident from below the mirror, or reflecting surface during hologram formation. The mirror M could, for example, consist of a suitably transmitting substrate coated with a multilayer dielectric stack MLS (see FIG. 6) designed to efficiently reflect the exposing laser radiation at the angle of exposure, but allow efficient transmission of the incoherent compensating radiation over some practical angular range or alternatively the reflecting surface could simply be a film-air interface.

The level of film absorption will clearly be wavelength dependent, however, it is envisaged that the wavelength and intensity of the compensating illumination could be carefully chosen to provide an approximate levelling out of the average film exposure throughout the whole of the film depth during the exposure process.

What is claimed is:

1. A method of producing a reflective holographic optical element comprising the steps of:
    exposing a photosensitive film on a holographic plate to incident radiation;
    reflecting radiation transmitted through the film back through the film to create a set of interference fringes therein; and
    during exposure of the film, progressively varying a condition of said incident radiation by a predetermined amount over a period of time, the condition being a condition on which the position of said fringes depends, said variation compensating for the effect of refractive index changes occurring through the depth of the film during said period of time due to absorption of actinic radiation thereby to maintain said fringes of said set stationary in said film over said period of time as said index changes.

2. A method as claimed in claim 1, wherein the incident radiation is constituted by an exposing radiation beam.

3. A method as claimed in claim 2, including the step of progressively changing the incident angle of the exposing radiation beam during the exposing of the photosensitive film to compensate for refractive index changes in the film during exposure.

4. A reflective holographic optical element produced by a method according to claim 1.

5. A method as claimed in claim 1, wherein instantaneous exposure of the holographic plate is levelled out throughout the whole of the film depth by simultaneous, additional exposure with uniform spatially incoherent radiation incident through a reflecting surface.

6. A method as claimed in claim 2, wherein instantaneous exposure of the holographic plate is levelled out throughout the whole of the film depth by simultaneous, additional exposure with uniform spatially incoherent radiation incident through a reflecting surface.

7. A method as claimed in claim 3, wherein instantaneous exposure of the holographic plate is levelled out throughout the whole of the film depth by simultaneous, additional exposure with uniform spatially incoherent radiation incident through a reflecting surface.

8. The method defined in claim 1, wherein said fringes are held stationary by progressively varying the incident angle of said radiation relative to the film during said exposure.

9. The method defined in claim 8, wherein the incident angle is varied by altering the position of a beam of said radiation.

10. The method defined in claim 8, wherein the incident angle is varied by holding a beam of said radiation stationary and rotating the photosensitive film.

11. The method defined in claim 1 wherein said fringes are held stationary by changing the wavelength of said incident radiation relative to the film.

12. A method of producing a reflective holographic optical element comprising the steps of:
    exposing a photosensitive film on a holographic plate to incident radiation;
    reflecting radiation transmitted through the film back into the film to create interference fringes; and
    during exposure of the film, progressively changing the wavelength of the incident radiation by a predetermined amount to compensate for refractive index changes occurring through the depth of the film during said exposure thereby to maintain the position of said fringes constant over a period of time as said index changes.

13. A method of producing a tunable reflective holographic filter element comprising exposing a photosensitive film on a holographic plate to incident radiation and reflecting radiation transmitted through the film back into the film to create a set of interference fringes, the incident angle of the radiation varying over the hologram aperture of the holographic plate, and , during exposure of the film, progressively shifting the plate laterally relative to the incident radiation over a period of time to compensate for the effect of refractive index changes occurring through the depth of the film during said period of time due to absorption of actinic radiation thereby to maintain said fringes of said set stationary over said period of time as said index changes.

* * * * *